(12) United States Patent
Vogt et al.

(10) Patent No.: US 11,675,062 B2
(45) Date of Patent: Jun. 13, 2023

(54) CONTEXT AWARE REAL-TIME POWER ADJUSTMENT FOR STEERABLE LIDAR

(71) Applicant: GM Cruise Holdings LLC, San Francisco, CA (US)

(72) Inventors: Kyle Vogt, San Francisco, CA (US); Lutfollah Maleki, Pasadena, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 913 days.

(21) Appl. No.: 16/245,229

(22) Filed: Jan. 10, 2019

(65) Prior Publication Data

US 2020/0225334 A1     Jul. 16, 2020

(51) Int. Cl.
  *G01S 7/4911* (2020.01)
  *G01S 17/931* (2020.01)
  *G01S 7/481* (2006.01)

(52) U.S. Cl.
  CPC .......... *G01S 7/4911* (2013.01); *G01S 7/4817* (2013.01); *G01S 17/931* (2020.01)

(58) Field of Classification Search
  None
  See application file for complete search history.

(56) References Cited

U.S. PATENT DOCUMENTS

| | | | |
|---|---|---|---|
| 5,241,315 A | 8/1993 | Spinhirne | |
| 7,583,364 B1 | 9/2009 | Mayor et al. | |
| 9,128,190 B1 | 9/2015 | Ulrich et al. | |
| 10,114,111 B2 | 8/2018 | Russell et al. | |
| 10,185,027 B2 | 1/2019 | O'Keeffe | |
| 10,401,480 B1* | 9/2019 | Gaalema | G01S 7/4804 |
| 2009/0273770 A1 | 11/2009 | Bauhahn et al. | |
| 2015/0346340 A1* | 12/2015 | Yaacobi | G01S 7/4915 356/5.11 |
| 2017/0123429 A1* | 5/2017 | Levinson | G01C 21/34 |
| 2017/0356983 A1* | 12/2017 | Jeong | G02F 1/292 |

(Continued)

OTHER PUBLICATIONS

"International Preliminary Report on Patentability for PCT Patent Application No. PCT/US2019/063896", dated Jun. 16, 2021, 9 Pages.

(Continued)

*Primary Examiner* — Yuqing Xiao
*Assistant Examiner* — Jempson Noel
(74) *Attorney, Agent, or Firm* — Calfee, Halter & Griswold LLP

(57) ABSTRACT

Various technologies described herein pertain to context aware real-time power adjusting for steerable lidar. A lidar system can include a laser source (e.g., FMCW) configured to emit an optical signal. The lidar system can further include a scanner configured to direct the optical signal emitted by the laser source from the lidar system into an environment. The optical signal can be directed over a field of view in the environment during time periods of frames. The lidar system can further include a controller configured to modulate a power of the optical signal emitted by the laser source between the frames and/or within one or more of the frames. The controller can modulate the power of the optical signal emitted by the laser source based on a position of the lidar system in the environment and a direction in which the optical signal is to be transmitted into the environment.

20 Claims, 10 Drawing Sheets

(56) References Cited

U.S. PATENT DOCUMENTS

| | | | |
|---|---|---|---|
| 2018/0024246 A1* | 1/2018 | Jeong | G01S 7/4817 359/204.1 |
| 2018/0136337 A1 | 5/2018 | Zohar et al. | |
| 2018/0284226 A1 | 10/2018 | LaChapelle et al. | |
| 2018/0284286 A1* | 10/2018 | Eichenholz | G01S 7/4812 |
| 2019/0107623 A1* | 4/2019 | Campbell | G01S 17/931 |

OTHER PUBLICATIONS

"International Search Report for PCT Patent Application No. PCT/US2019/063896" dated Apr. 17, 2020, 4 Pages.
"Written Opinion of the International Searching Authority for PCT Patent Application No. PCT/US2019/063896", dated Apr. 17, 2020, 8 Pages.

* cited by examiner

CONTEXT AWARE REAL-TIME POWER ADJUSTMENT FOR STEERABLE LIDAR

BACKGROUND

Light detection and ranging (lidar) systems are surveying systems that measure distance to a target in an environment by illuminating the target with laser light and measuring reflected light (lidar return). Differences in laser return times can be utilized to generate a three-dimensional (3D) representation of the target. Lidar systems can also be used to measure the velocity of the target with respect to the observer. Thus, lidar systems can be used in various terrestrial, airborne, and mobile applications; for instance, lidar systems can be employed in autonomous or semi-autonomous vehicles, drones, robotics and other applications that utilize laser scanning capabilities.

One type of lidar system is a direct time of flight (TOF) lidar system. A direct TOF lidar system emits an optical signal that includes short pulses of light, such that the pulses of light can reflect off a target in an environment (assuming a target is in a position in the environment towards which the pulses of light are directed). The direct TOF lidar system can receive reflected pulses (e.g., the pulses of light that reflect off the target, if any). A delay between transmission and reception can be utilized to determine the distance between the direct TOF lidar system and the target. The direct TOF lidar system may also determine a speed of the target by comparing two frames of data; assuming that the target is identified in two frames captured at different times, a change in the position of the target over time can be utilized to determine the speed of the target.

Another type of lidar system is a frequency-modulated continuous wave (FMCW) lidar system. A FMCW lidar system can include a laser source that generates a frequency-modulated optical signal that includes a continuous series of optical chirps, where the frequency within each chirp varies with time. The FMCW lidar system can transmit the optical chirps across an environment. Moreover, a receiver of the FMCW lidar system can receive reflected optical signals (e.g., the optical chirps that reflect off a target located in the environment, if any). Measurement of a frequency shift and/or a phase shift for each reflected optical chirp relative to a reference optical chirp can provide a measure of a distance and/or a velocity of the target relative to the FMCW lidar system.

In many lidar systems, such as, for example, a lidar system used in an autonomous vehicle, the optical signal is scanned in space to encompass a desired field of view. Various scanning mechanisms such as rotating mirrors or rotating lasers, for example, may be used to scan the optical signal of the lidar system.

It is oftentimes desirable to increase signal-to-noise ratio (SNR) of a lidar system. SNR of a lidar system can be increased by increasing a power level of a signal received by the lidar system, decreasing noise received by the lidar system, or a combination thereof. The power level of a signal received by the lidar system can be increased by increasing a power level of an optical signal transmitted by the lidar system. However, conventional lidar systems used for applications around people are typically limited to a maximum power level needed to make the laser source eye-safe. According to an illustration, the accepted value of eye-safe energy at 1550 nm is 8 millijoules. Following this illustration, a laser emitting 8 milliwatt of power can cause eye damage in 1 s of exposure. If the duration of exposure is reduced by a factor of 10, then the laser power can be increased by a factor of 10 before causing eye damage. Thus, eye safety of a lidar system is determined by the product of the power level of light and exposure time of the light on the retina. When scanning an optical signal outputted by the lidar system to cover the desired field of view, the exposure time is reduced compared to a staring geometry. The amount of reduction of exposure time depends on details of the scan pattern, and is typical more than a factor of 10 smaller than the case of staring mode.

Moreover, lidar systems oftentimes have limited thermal capability. Since heat can impact operations of lidar systems, some traditional lidar systems attempt to remove heat from the lidar systems. However, as a power level of a laser source (e.g., a laser or an optical amplifier if a low power laser is used) increases, it can become more difficult (if even possible) to design a lidar system with sufficient capability to deal with heat outputted by the laser (or optical amplifier if a low power laser is used) operating at high power.

SUMMARY

The following is a brief summary of subject matter that is described in greater detail herein. This summary is not intended to be limiting as to the scope of the claims.

Described herein are various technologies that pertain to context aware real-time power adjusting for steerable lidar. A lidar system can include a laser source configured to emit an optical signal (e.g., lidar beam). According to an example, the laser source can be a frequency-modulated continuous wave (FMCW) laser source. The lidar system can further include a scanner configured to direct the optical signal emitted by the laser source from the lidar system into an environment. The optical signal can be directed over a field of view in the environment during time periods of frames. The lidar system can further include a controller configured to modulate a power of the optical signal emitted by the laser source between the frames and/or within one or more of the frames. The controller can modulate the power of the optical signal emitted by the laser source based on a position of the lidar system in the environment and a direction in which the optical signal is to be transmitted into in the environment.

According to various embodiments, the lidar system can modulate the power of the optical signal within a frame. In accordance with such embodiments, the scanner of the lidar system can be configured to direct the optical signal emitted by the laser source from the lidar system into the environment, where the scanner directs the optical signal over a field of view in the environment during a time period of the frame. The scanner can direct the optical signal over the field of view based on a scan pattern (e.g., a raster scan pattern). The controller of the lidar system can further be configured to modulate the power of the optical signal emitted by the laser source during the time period of the frame based on the position of the lidar system in the environment and the direction in which the optical signal is to be transmitted into the environment. The controller can control the laser source to emit the optical signal at a first power level when the scanner directs the optical signal over a first spatial portion of the field of view in the environment during the time period of the frame. Moreover, the controller can control the laser source to emit the optical signal at a second power level when the scanner directs the optical signal over a second spatial portion of the field of view in the environment during the time period of the frame. In the foregoing, the first power level differs from the second power level (e.g., the first power level can be higher than the second power level, the second power level can be higher than the first power level).

Additionally or alternatively, pursuant to various embodiments, the lidar system can be configured to modulate the power of the optical signal between frames. The scanner of the lidar system can direct the optical signal over the field of view in the environment during time periods of the frames. The controller of the lidar system can be configured to modulate the power of the optical signal emitted by the laser source between the frames based on the position of the lidar system in the environment and the direction in which the optical signal is to be transmitted into the environment. Following such embodiments, the controller can control the laser source to emit the optical signal at a first power level when the scanner directs the optical signal over at least a portion of the field of view in the environment during a first time period of a first frame. Moreover, the controller can control the laser source to emit the optical signal at a second power level when the scanner directs the optical signal over the portion of the field of view in the environment during a second time period of a second frame. Following such embodiment, the first power level can differ from the second power level.

The controller can modulate the power of the optical signal emitted by the laser source during a frame and/or between frames based on various factors in addition to the position of the lidar system in the environment and the direction in which the optical signal is to be transmitted into the environment. For instance, the controller can be configured to modulate the power of the optical signal based on data from a three-dimensional (3D) map of the environment. According to another example, the controller can be configured to modulate the power of the optical signal based on a previous lidar scan of the environment. Pursuant to another example, the controller can be configured to modulate the power of the optical signal based on perception data generated by a differing type of sensor system in an autonomous vehicle (e.g., a sensor system other than a lidar sensor system). In yet another example, the controller can be configured to modulate the power of the optical signal based on a maneuver to be performed by autonomous vehicle in the environment. In yet another example, the controller can be configured to modulate the power of the optical signal based on distance and speed of a target. It is also contemplated that a combination of one or more of the foregoing can be utilized by the controller to modulate the power of the optical signal within a frame and/or between frames.

It is to be appreciated that the lidar system as described herein can be included in an autonomous vehicle. However, it is also contemplated that such lidar system can be utilized in a semi-autonomous vehicle, a drone, or substantially any type of application that utilizes laser scanning capabilities.

The technologies described herein present various advantages over conventional lidar systems. In particular, a power level of the laser source (e.g., the FMCW laser source) of the lidar system set forth herein can be higher than a power level of a traditional laser source of a conventional lidar system (e.g., a conventional FMCW lidar system), which can enable increasing SNR for the frame(s) or spatial portion(s) of frame(s) surveyed utilizing the higher power level(s). Accordingly, the power level of the laser source can be dynamically adjusted based on where the optical signal is pointed (e.g., the power level can be increased when pointed towards a geographic area of interest and the power level can be lowered when likely pointed towards the ground, the sky, a building, etc.). Lower power level(s) of the laser source for some frame(s) and/or spatial portion(s) of frame(s) enable the lidar system to operate within the eye-safe limit as well as manage limited thermal capability of the lidar system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
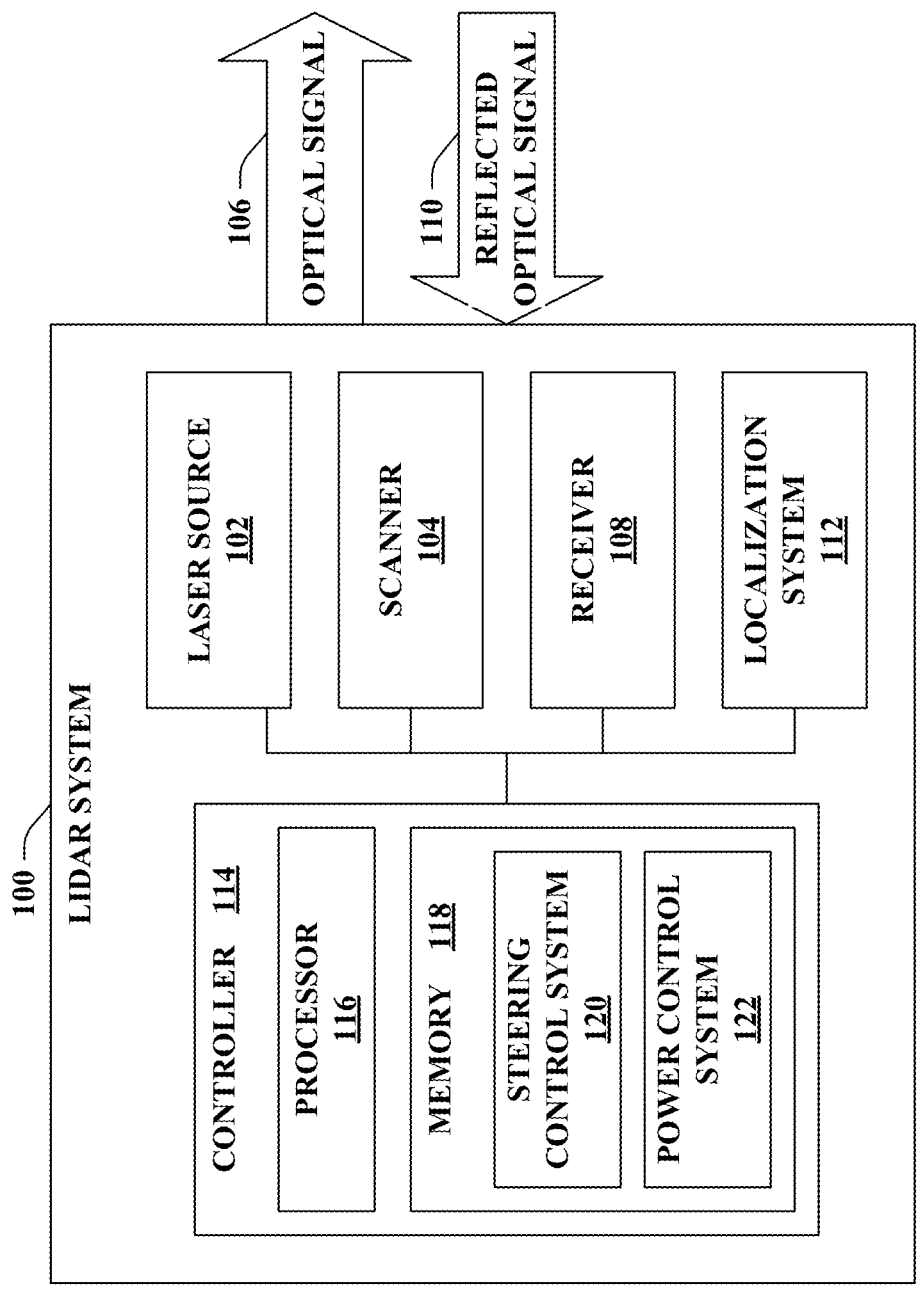
FIG. 1 illustrates a functional block diagram of an exemplary lidar system.

Various technologies pertaining to context aware real-time power adjustment for steerable lidar are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Terms such as "first" and "second" are used herein. It is to be appreciated that these terms are used for purposes of identifying different items of the same type (e.g., a first power level and a second power level), and are not necessarily meant to convey some sort of ordering or relative comparison between the different items.

As used herein, the term "laser source" is intended to encompass a laser or a laser used in combination with one or more optical amplifiers. Moreover, as used herein, the term "frequency-modulated continuous wave (FMCW) laser source" is intended to encompass both 1) a laser source that generates a frequency-modulated optical signal including a continuous series of optical chirps and 2) a continuous wave laser source in combination with a device (or devices) that produce frequency modulation.

Referring now to the drawings, FIG. 1 illustrates an exemplary lidar system 100. The lidar system 100 can employ context aware real-time power adjustment. The lidar system 100 includes a laser source 102 configured to emit an optical signal. The laser source 102 can be a frequency-modulated continuous wave (FMCW) laser source; accordingly, many of the examples set forth herein describe the laser source 102 as being an FMCW laser source (e.g., the laser source 102 is referred to herein as the FMCW laser source 102). It is to be appreciated, however, that in other embodiments the laser source 102 can alternatively be a direct TOF laser source; thus, the examples described herein can be extended to scenarios where the laser source 102 is a direct TOF laser source. For instance, in a scenario where the laser source 102 is a direct TOF laser source, it is contemplated that power and pulse width of the optical signal 106 can be adjusted (e.g., increasing power and decreasing pulse width can increase resolution).

The lidar system 100 can further include a scanner 104 configured to direct the optical signal 106 emitted by the FMCW laser source 102 from the lidar system 100 into an environment. The optical signal 106 can be directed by the scanner 104 over a field of view in the environment during time periods of frames. According to an example, the scanner 104 can include a two-dimensional (2D) micro-electro-mechanical systems (MEMS) mirror. Pursuant to another example, the scanner 104 can include a non-MEMS reflecting 2D analog scanner, such as a mirror galvanometer; however, the claimed subject matter is not so limited.

While not shown, it is to be appreciated that the lidar system 100 can further include a transmitter that can include various optical elements, such as one or more lenses, an optical isolator, a resonator, waveguide, an optical amplifier, an interferometer, and so forth. Such optical elements can enable generating the optical signal 106 (e.g., a beam) with desired properties such as collimation, divergence angle, linewidth, power, and the like. Such optical elements may be assembled discretely, or integrated on a chip, or in a combination of both.

According to embodiments where the laser source 102 is an FMCW laser source, the optical signal 106 can include a continuous series of optical chirps. Moreover, pursuant to embodiments where the laser source 102 is a direct TOF laser source, the optical signal 106 can include pulses of laser light.

The lidar system 100 can further include a receiver 108 configured to sense a reflected optical signal 110 at the lidar system 100. Pursuant to an example (e.g., the laser source 102 is an FMCW laser source), the reflected optical signal 110 can include chirps that reflect off of a target in the environment. Moreover, the reflected optical signal 110 sensed by the receiver 108 can be converted into electrical signals by various components of the lidar system 100 (e.g., an analog-to-digital converter (ADC), a signal processor, etc.).

The lidar system 100 can further include a localization system 112 configured to determine a position of the lidar system 100 in the environment and an orientation of the lidar system 100 in the environment. The localization system 112 can determine the absolute position and orientation of the lidar system 100. According to an example, the localization system 112 can include a Global Positioning System (GPS) receiver and an Inertial Measurement Unit (IMU).

Moreover, the lidar system 100 includes a controller 114 configured to modulate a power of the optical signal 106 emitted by the FMCW laser source 102. The power of the optical signal 106 can be modulated by the controller 114 based on the position of the lidar system 100 in the environment as determined by the localization system 112. The power of the optical signal 106 can also be modulated by the controller 114 based on a direction in which the optical signal 106 is to be transmitted into the environment. According to various examples, the direction in which the optical signal 106 is to be transmitted into the environment can be based on the orientation of the lidar system 100 in the environment as determined by the localization system 112, an orientation of the scanner 104 (or a portion thereof), an orientation of a rotating mirror, an orientation of a rotating laser, a combination thereof, or the like. The power of the optical signal 106 can be modulated by the controller 114 between frames and/or within a frame.

The controller 114 can be in communication with the laser source 102, the scanner 104, the receiver 108, and/or the localization system 112. The controller 114 can include a processor 116 and memory 118. The memory 118 includes computer-executable instructions that are executed by the processor 116. The memory 118 can include a steering control system 120 that can control positioning of the scanner 104 to cause the scanner 104 to direct the optical signal 106 into the environment according to a scan pattern. The steering control system 120 can control movement of the scanner 104. According to an example where the scanner 104 includes a 2D MEMS mirror, the steering control system 120 can cause the 2D MEMS mirror to tilt in an azimuthal direction and/or an elevation direction. Accordingly, the scanner 104 can direct the optical signal 106 over a field of view in the environment during a time period of a frame based on a scan pattern. In accordance with an example, the scan pattern can be a raster scan pattern. However, it is to be appreciated that the steering control system 120 can alternatively cause the scanner 104 to direct the optical signal 106 into the environment using other scan patterns, such as Lissajous or non-regular forms.

The memory 118 also includes a power control system 122 that can control the power of the optical signal 106 emitted by the FMCW laser source 102. The power control system 122 can dynamically adjust the power of the optical signal 106 outputted by the laser source 102 based on where the optical signal 106 is directed (e.g., by the scanner 104 as controlled by the steering control system 120). The power control system 122 can adjust the power based on the position of the lidar system 100 in the environment and the direction in which the optical signal 106 is to be transmitted into the environment. The power control system 122 can also adjust the power of the optical signal 106 based a field of view of a frame relative to the environment or a spatial portion of the field of view of the frame relative to the environment. Thus, the power control system 122 enables the power of the optical signal 106 to be dynamically adjusted based on where the optical signal 106 is pointing as controlled by the steering control system 120.

A power level of the FMCW laser source 102 of the lidar system 100 can be higher than a power level of a traditional laser source of a conventional FMCW lidar system (for at least a part of a period of time). According to an illustration, average laser power for some conventional FMCW lidar systems can be 100 milliwatts (continuous power), whereas the laser power of the FMCW laser source 102 can be controlled by the controller 114 to be above 100 milliwatts (e.g., a multiple of 100 milliwatts up to the eye-safe limit) for a limited duration of time. Use of higher power level(s) for the optical signal 106 enables the lidar system 100 to increase SNR for the frame(s) or spatial portion(s) of the frame(s) surveyed utilizing the higher power level(s). The higher power level(s) for the optical signal 106 also allow for detecting object(s) at farther distances from the lidar system 100. Accordingly, the power of the laser source 102 can be dynamically adjusted based on where the optical signal 106 is pointed (e.g., the power level can be increased when pointed towards a geographic area of interest and the power level can be lowered when likely pointed towards the ground, the sky, a building, etc.). Lower power level(s) of the laser source 102 for some frame(s) and/or spatial portion(s) of frame(s) enable the lidar system 100 to operate within the eye-safe limit as well as manage limited thermal capability of the lidar system 100 (e.g., an average power for the lidar system 100 can be below the eye-safe limit and can satisfy the thermal capability of the lidar system 100). According to an illustration, data from a 3D map, a previous lidar scan, etc. can be used to determine whether the ground, a building, the sky, etc. is likely located in a direction at which the lidar system 100 is pointed; thus, the controller 114 can reduce the power of the laser source 102 when the optical signal 106 is pointing in such directions. Moreover, when the optical signal 106 is aimed along the horizon or near a geographic area of interest, the power level of the optical signal 106 emitted by the laser source 102 can be increased by the controller 114 (e.g., to increase SNR when surveying in such directions).

According to an example, the lidar system 100 can include an integrated circuit, where the integrated circuit includes elements described herein as being part of the lidar system 100. Pursuant to another example, the lidar system 100 can include discrete elements. In accordance with a further example, the lidar system 100 can include a combination of an integrated circuit and discrete element(s).

Figure 2:
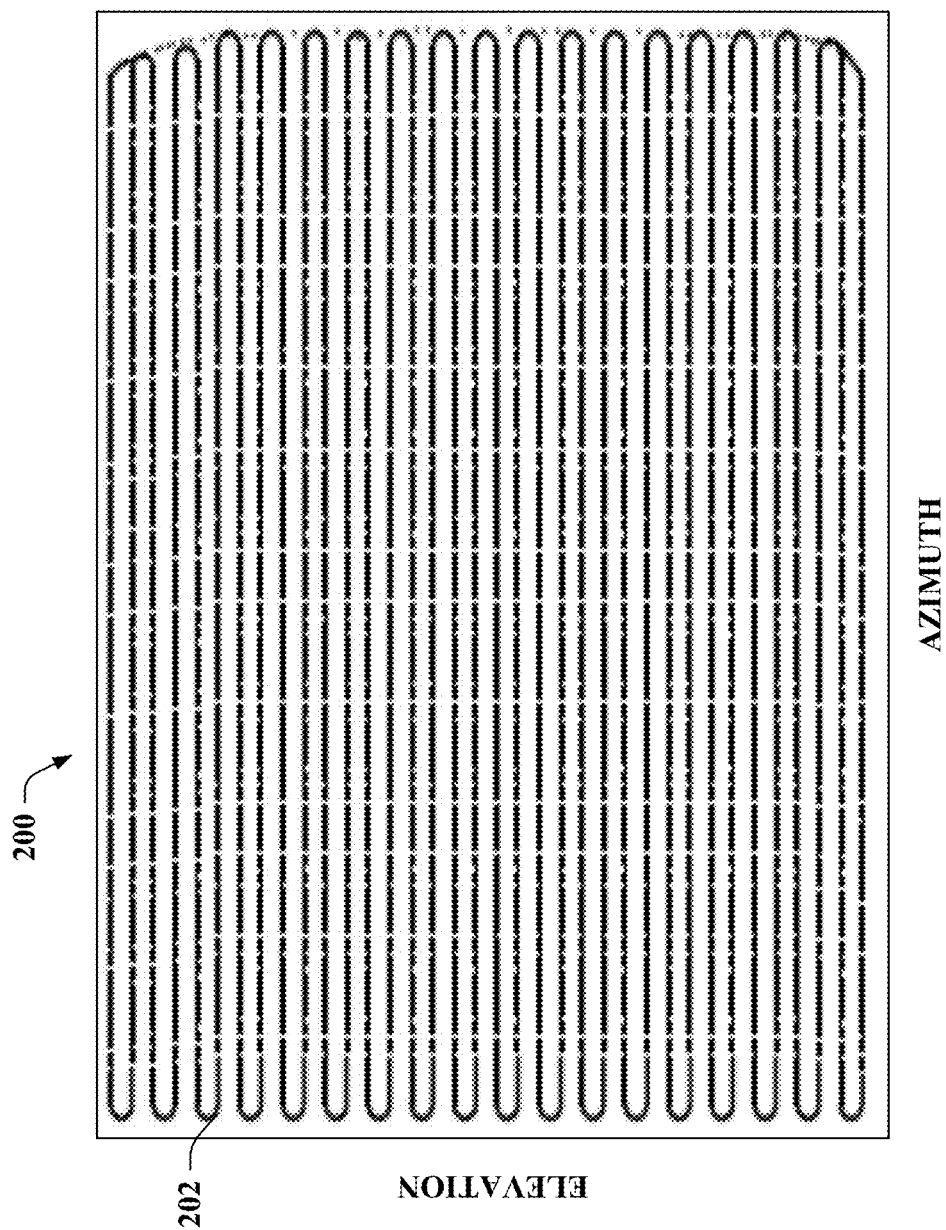
FIG. 2 illustrates an exemplary frame for the lidar system.

Now turning to FIG. 2, illustrated is an exemplary frame 200 for the lidar system 100. The lidar system 100 can scan the frame 200 during a time period; a duration of time for the lidar system 100 to direct the optical signal 106 over the field of view of the frame 200 based on a scan pattern is referred to herein as a time period of a frame (e.g., 10 frames can be captured per second). The optical signal 106 can be directed over a field of view based on a scan pattern 202 within the frame 200. The scan pattern 202 depicted in FIG. 2 is a raster scan pattern; however, the scan pattern 202 is presented for illustration purposes, and the claimed subject matter is not so limited. The scan pattern 202 can result from the scanner 104 directing the optical signal 106 emitted by the FMCW laser source 102 from the lidar system 100 into the environment.

The scan pattern 202 can cover substantially any field of view in the azimuthal direction and the elevation direction. Moreover, if the lidar system 100 is utilized in an autonomous vehicle, 360-degree azimuthal coverage can be provided by the lidar system 100 or a plurality of such lidar systems. Pursuant to an illustration, each frame (e.g., the frame 200) can cover less than 360 degrees in the azimuthal direction (e.g., multiple frames such as the frame 200 can be used in combination to cover 360 degrees in the azimuthal direction). According to another illustration, the frame 200 can extend 360 degrees in the azimuthal direction.

Reference is again made to FIG. 1. According to various embodiments, the controller 114 can be configured to modulate the power of the optical signal 106 emitted by the FMCW laser source 102 during a time period of a frame based on the position of the lidar system 100 in the environment and the direction in which the optical signal 106 is to be transmitted into the environment. The controller 114 (e.g., the power control system 122) can control the FMCW laser source 102 to emit the optical signal at a first power level when the scanner 104 directs the optical signal over a first spatial portion of the field of view in the environment during the time period of the frame. Moreover, the controller 114 (e.g., the power control system 122) can control the FMCW laser source 102 to emit the optical signal 106 at a second power level when the scanner 104 directs the optical signal 106 over a second spatial portion of the field of view in the environment during the time period of the frame. Following the foregoing example, the first power level can be higher than the second power level or the first power level can be less than the second power level. Moreover, it is to be appreciated that the controller 114 (e.g., the power control system 122) can control the FMCW laser source 102 to emit the optical signal 106 at more than two different power levels for more than two different spatial portions of the field of view in the environment during the time period of the frame.

Figure 3:
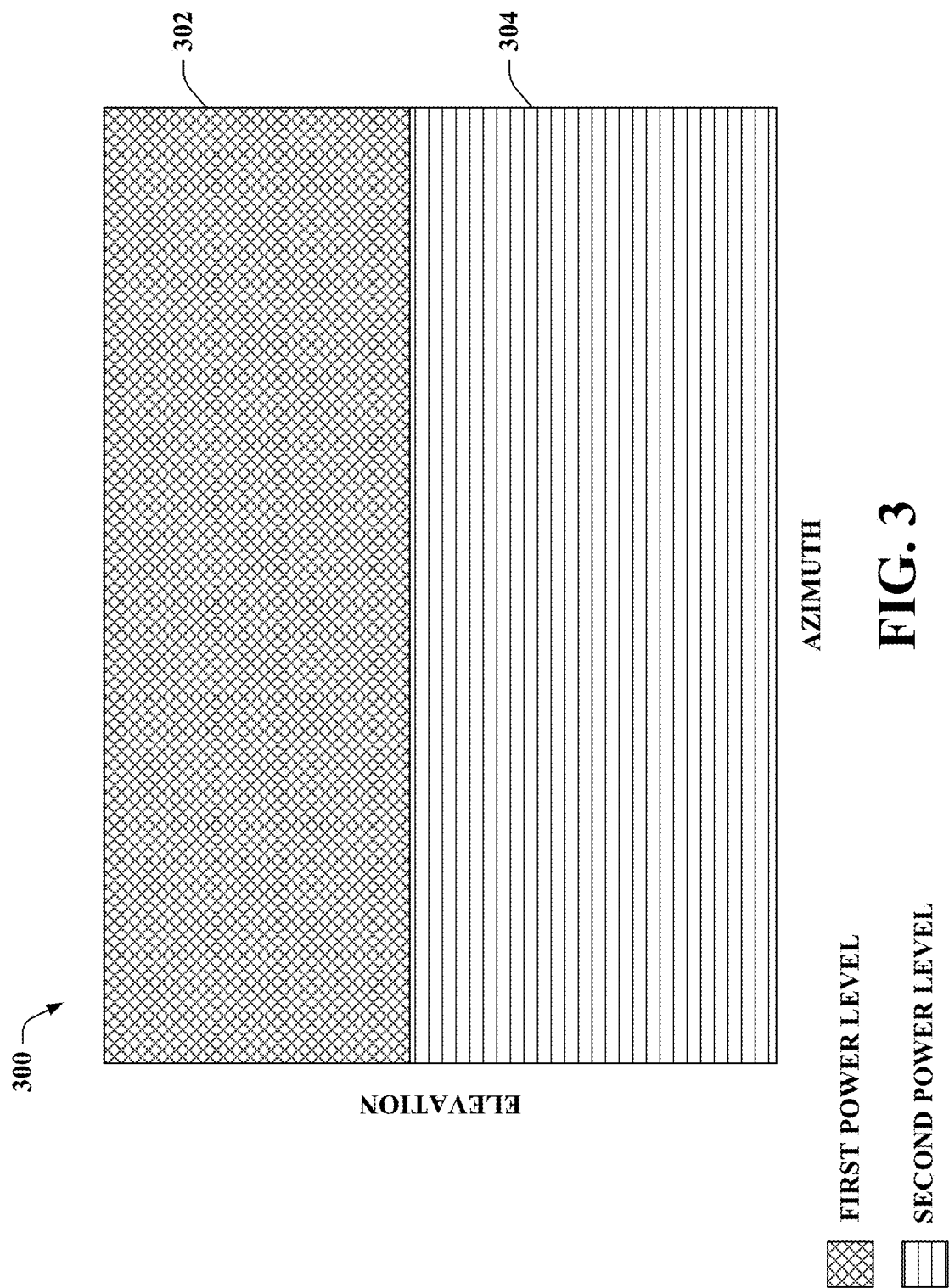
FIG. 3 illustrates an exemplary frame that includes two different spatial portions, where a power level of an optical signal differs when the optical signal is directed towards the different spatial portions of the frame.

FIG. 3 depicts an exemplary frame 300 that includes two different spatial portions, namely, a first spatial portion 302 and a second spatial portion 304. The first spatial portion 302 and the second spatial portion 304 are nonoverlapping. The controller 114 of the lidar system 100 can control the laser source 102 to emit the optical signal 106 at a first power level when the scanner 104 directs the optical signal 106 over the first spatial portion 302 of the field of view in the environment during the time period of the frame 300. Moreover, the controller 114 can control the laser source 102 to emit the optical signal 106 at a second power level when the scanner 104 directs the optical signal 106 over the second spatial portion 304 of the field of view in the environment during the time period of the frame 300.

Figure 4:
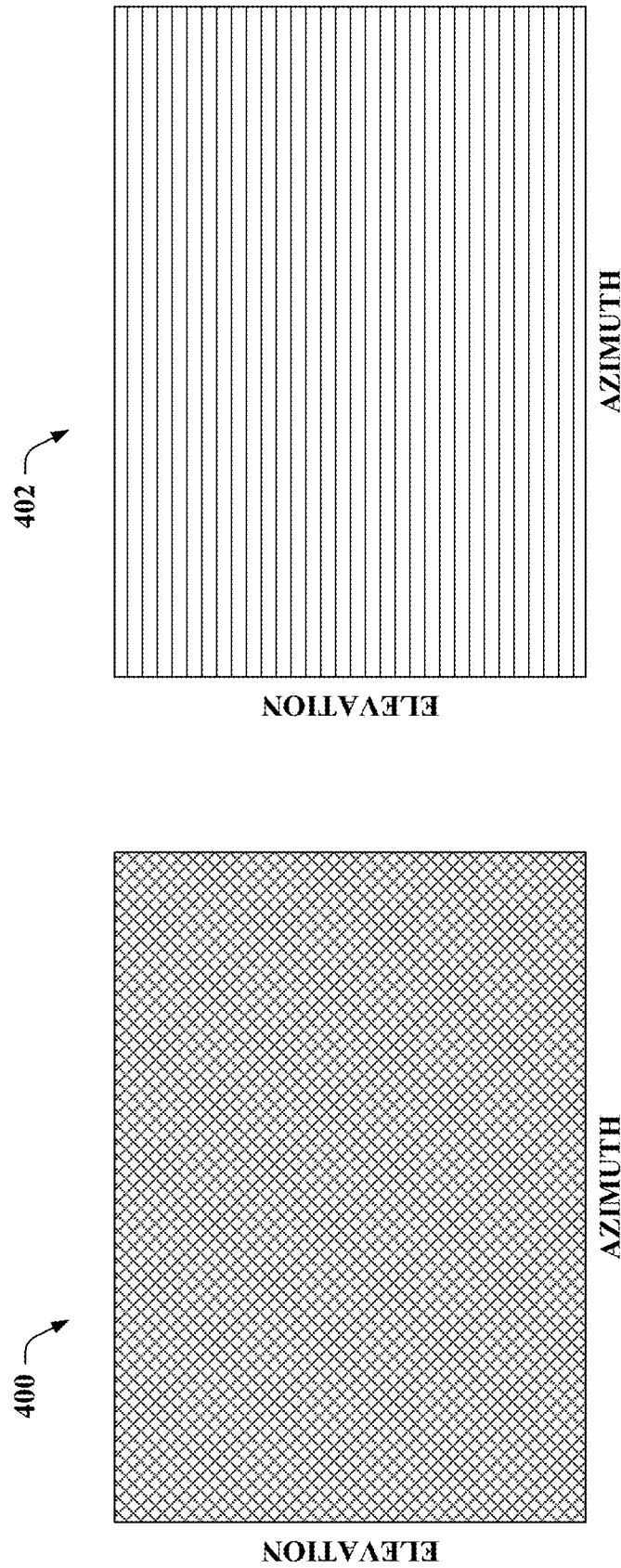
FIG. 4 illustrates exemplary frames for the lidar system, where a power level of an optical signal differs between the frames.
Figure 5:
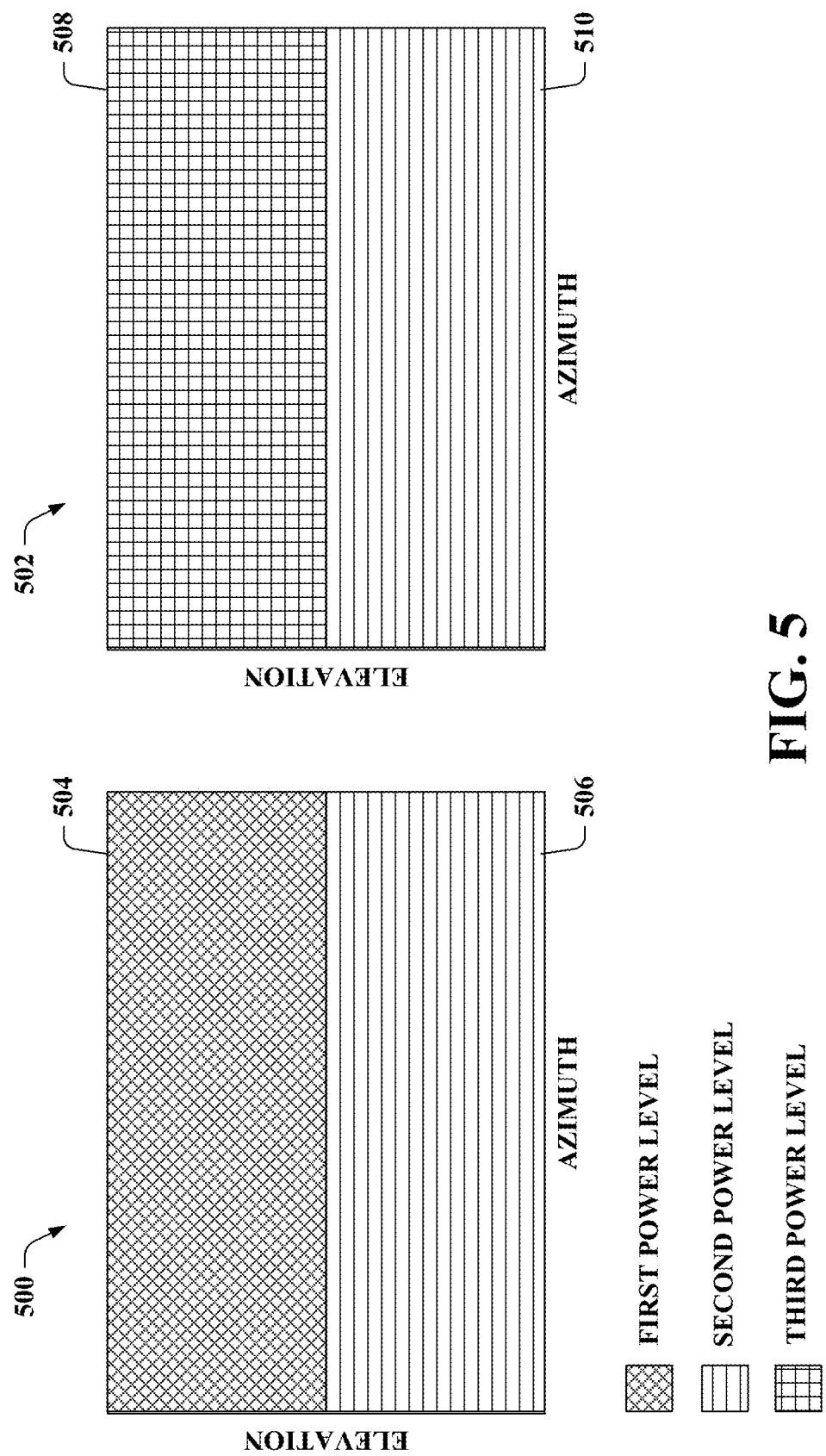
FIG. 5 illustrates exemplary frames for the lidar system, where a power level of an optical signal differs between and within the frames.

Differing power levels are represented by different fill patterns within the spatial portions 302-304 in FIG. 3 (as well as in other figures herein). The fill patterns shown in FIGS. 3-5 are not intended to represent scan patterns. Further, while the spatial portions 302-304 are represented in FIG. 3 as extending across the azimuthal direction of the frame 300, it is to be appreciated that substantially any shape spatial portion can be utilized by the lidar system 100. Moreover, according to another example, it is contemplated that the power level can be controlled on a pixel-by-pixel basis within a frame.

Reference is again made to FIG. 1. Various factors in addition to the position of the lidar system 100 and the direction in which the optical signal 106 is to be transmitted into the environment can be utilized by the controller 114 (e.g., the power control system 122) to identify the first spatial portion and the second spatial portion of the field of view in the environment during the time period of the frame. For instance, the controller 114 can utilize a 3D map of the environment, a previous lidar scan of the environment, perception data of the environment generated by a different type of sensor system of an autonomous vehicle, a maneuver to be performed by an autonomous vehicle in the environment, distance and speed of a target, or a combination thereof in addition to the position of the lidar system 100 in the environment and the direction in which the optical signal 106 is to be transmitted into the environment.

According to an example, the controller 114 can be configured to identify the first spatial portion and the second spatial portion of the field of view in the environment based on data from a 3D map of the environment, the position of the lidar system 100 in the environment, and the direction in which the optical signal 106 is to be transmitted into the environment. According to another example, the controller 114 can be configured to identify the first spatial portion and the second spatial portion of the field of view in the environment based on a previous lidar scan of the environment, the position of the lidar system 100 in the environment, and the direction in which the optical signal 106 is to be transmitted into the environment. In accordance with a further example, the controller 114 can be configured to identify the first spatial portion and the second spatial portion of the field of view in the environment based on perception data of the environment generated by a different type of sensor system of an autonomous vehicle, the position of the lidar system 100 in the environment, and the direction in which the optical signal 106 is to be transmitted into the environment. According to yet another example, the controller 114 can be configured to identify the first spatial portion and the second spatial portion of the field of view in the environment based on a maneuver to be performed by an autonomous vehicle in the environment, the position of the lidar system 100 in the environment, and the direction in which the optical signal 106 is to be transmitted into the environment. In another example, the controller 114 can be configured to identify the first spatial portion and the second spatial portion of the field of view in the environment based on distance and speed of a target, the position of the lidar system 100 in the environment, and the direction in which the optical signal 106 is to be transmitted into the environment.

As noted above, the controller 114 (e.g., the power control system 122) can additionally or alternatively modulate the power of the optical signal 106 emitted by the FMCW laser source 102 between frames. The power of the optical signal 106 emitted by the FMCW laser source 102 can be modulated between the frames based on the position of the lidar system 100 in the environment and the direction in which the optical signal 106 is to be transmitted into the environment. Accordingly, the controller 114 can control the FMCW laser source 102 to emit the optical signal 106 at a first power level when the scanner 104 directs the optical signal over at least a portion of the field of view in the environment during a first time period of a first frame. Moreover, the controller 114 can control the FMCW laser source 102 to emit the optical signal at a second power level when the scanner 104 directs the optical signal 106 over the portion of the field of view in the environment during a second time period of a second frame. Again, the first power level can differ from the second power level (e.g., the first power level can be higher than or less than the second power level). Similar to above, the controller 114 can be configured to modulate the power of the optical signal 106 emitted by the FMCW laser source 102 between the frames further based on data from a 3D map of the environment, a previous lidar scan of the environment, perception data generated by a differing type of sensor system of an autonomous vehicle, a maneuver to be performed by an autonomous vehicle in the environment, distance and speed of a target in the environment, a combination thereof, and so forth.

Now turning to FIG. 4, depicted are a plurality of frames for the lidar system 100, namely, a first frame 400 and a second frame 402; the power level of the optical signal 106 emitted by the laser source 102 differs between the first frame 400 and the second frame 402 The first frame 400 and the second frame 402 can be adjacent in time (e.g., a time period of the first frame 400 can be immediately before a time period of the second frame 402). Alternatively, one or more frames can be between the first frame 400 and the second frame 402 in time. As noted above, the controller 114 of the lidar system 100 can control the FMCW laser source 102 to emit the optical signal 106 at a first power level during the first time period of the first frame 400. Further, the controller 114 can control the FMCW laser source 102 to emit the optical signal 106 at a second power level during a second time period of the second frame 402. In the example shown in FIG. 4, the same power level can be used over the entire field of view during a given time period of a given frame (e.g., the first power level can be used over the entire field of view during the first time period of the first frame 400).

Now referring to FIG. 5, depicted are a plurality of frames for the lidar system 100, namely, a first frame 500 and a second frame 502; the power level of the optical signal 106 emitted by the laser source 102 differs between the first frame 500 and the second frame 502 for at least a spatial portion of such frames 500-502. Thus, FIG. 5 depicts an example where the controller 114 controls the power level of the laser source 102 both within a frame as well as between frames.

The first frame 500 includes a first spatial portion 504 and a second spatial portion 506. Moreover, the second frame 502 includes a third spatial portion 508 and a fourth spatial portion 510. It is contemplated that the first spatial portion 504 of the first frame 500 and the third spatial portion 508 of the second frame 502 can be the same or differ (e.g., same portion of the overall field of view in both frames 500-502, differing portions of the overall field of view in the frames 500-502). Likewise, the second spatial portion 506 of the first frame 500 and the fourth spatial portion 510 of the second frame 502 can be the same or differ.

As shown, a power level of the FMCW laser source 102 can be controlled such that the laser source 102 emits the optical signal 106 at a first power level when the scanner 104 directs the optical signal 106 over the first spatial portion 504 of the field of view in the environment during a first time period of the first frame 500 and a second power level when the scanner 104 directs the optical signal 106 over the second spatial portion 506 of the field of view in the environment during the first time period of the first frame 500. Moreover, the controller 114 can control the FMCW laser source 102 to emit the optical signal 106 at a third power level when the scanner 104 directs the optical signal 106 over the third spatial portion 508 of the field of view in the environment during the second time period of the second frame 502 (e.g., the third power level differs from the first power level). As shown in FIG. 5, the controller 114 can control the FMCW laser source 102 to emit the optical signal 106 at the second power level when the scanner 104 directs the optical signal 106 over the fourth spatial portion 510 of the field of view in the environment during the second time period of the second frame 502. Thus, in the example shown, the same power level can be utilized for the second spatial portion 506 and the fourth spatial portion 510 (which can be the same portions of the overall field of view of the frames 500-502), whereas different power levels can be utilized for the first spatial portion 504 and the third spatial portion 508 (which can be the same portions of the overall field of view of the frames 500-502).

Accordingly, the controller 114 can adjust the power level of the optical signal 106 emitted by the FMCW laser source 102 between the frame 500 and the subsequent frame 502. According to another example, it is to be appreciated that the controller 114 can control the FMCW laser source 102 to emit the optical signal 106 at a constant power level as the scanner 104 directs the optical signal 106 over the field of view in the environment during a time period of a frame. Thus, according to an illustration, it is to be appreciated that third power level and the second power level can be the same (e.g., the power level for the frame 502 can be uniform over the frame 502).

Figure 6:
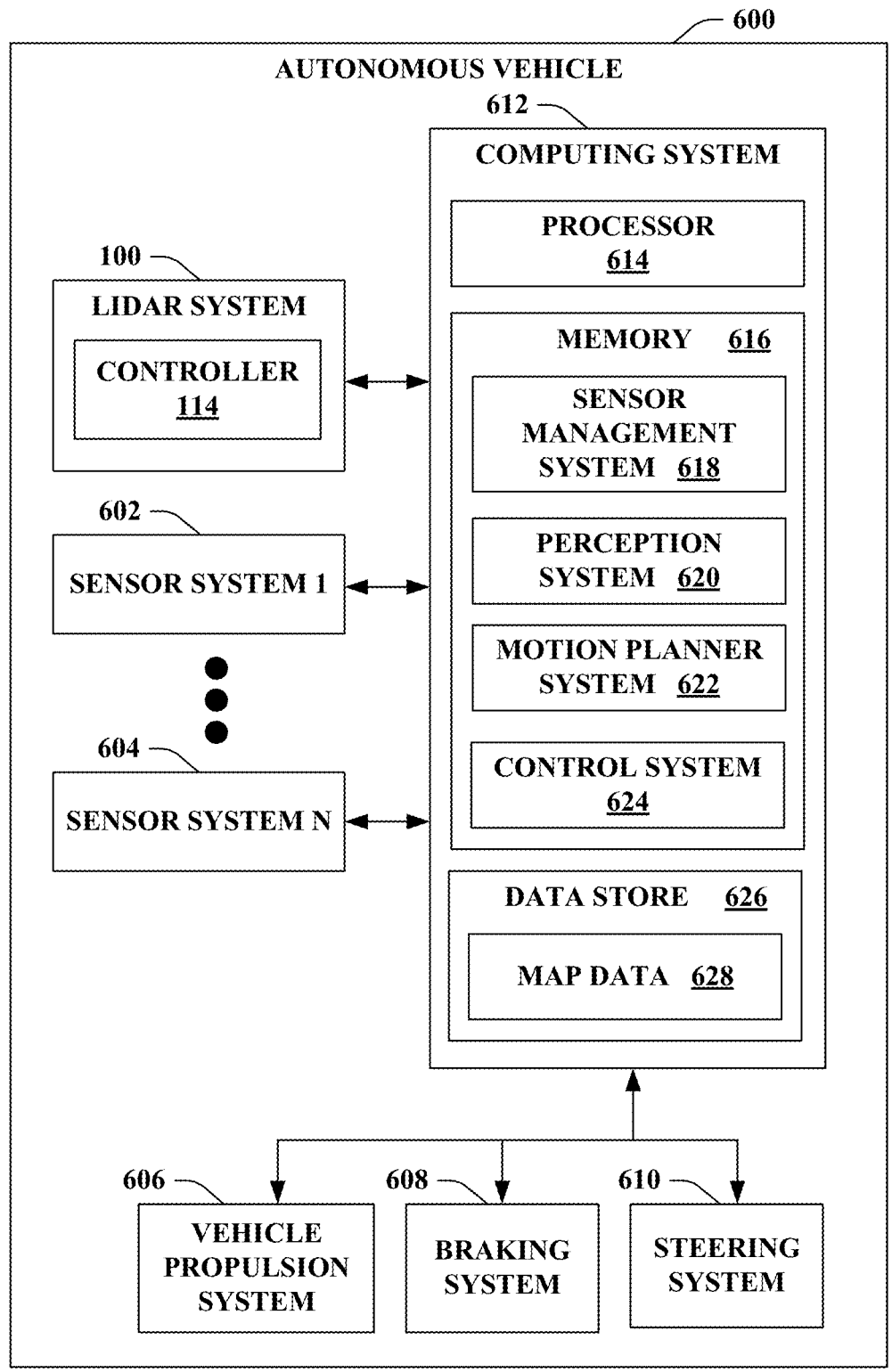
FIG. 6 illustrates a functional block diagram of an exemplary autonomous vehicle that includes the lidar system of FIG. 1.

With reference to FIG. 6, illustrated is an exemplary autonomous vehicle 600. The autonomous vehicle 600 can navigate about roadways without a human driver based on sensor signals outputted by sensor systems of the autonomous vehicle 600. The autonomous vehicle 600 includes the lidar system 100 as well as one or more other sensor systems, namely, a sensor system 1 602, . . . , and a sensor system N 604, where N can be substantially any integer greater than 1. The sensor system 1 602, . . . , and the sensor system N 604 are collectively referred to herein as sensor systems 602-604. The sensor systems 602-604 are of different types and are arranged about the autonomous vehicle 600. For example, the sensor system 1 602 may be a radar sensor system and the sensor system N 604 may be a camera sensor system. Other exemplary sensor systems included in the sensor systems 602-604 can include GPS sensor systems, sonar sensor systems, infrared sensor systems, and the like.

The autonomous vehicle 600 further includes several mechanical systems that are used to effectuate appropriate motion of the autonomous vehicle 600. For instance, the mechanical systems can include, but are not limited to, and a vehicle propulsion system 606, a braking system 608, and a steering system 610. The vehicle propulsion system 606 can include an electric engine, an internal combustion engine, or a combination thereof. The braking system 608 can include an engine brake, brake pads, actuators, and/or any other suitable componentry that is configured to assist in decelerating the autonomous vehicle 600. The steering system 610 includes suitable componentry that is configured to control the direction of movement of the autonomous vehicle 600.

The autonomous vehicle 600 additionally includes a computing system 612 that is in communication with the lidar sensor 100, the sensor system 602-604, the vehicle propulsion system 606, the braking system 608, and the steering system 610. The computing system 612 includes a processor 614 and memory 616; the memory 616 includes computer-executable instructions are executed by the processor 614. Pursuant to various examples, the processor 614 can be or include a graphics processing unit (GPU), a plurality of GPUs, a central processing unit (CPU), a plurality of CPUs, and application-specific integrated circuit (ASIC), a microcontroller, a programmable logic controller (PLC), a field programmable gate array (FPGA), or the like.

The memory 616 of the computing system 612 includes a sensor management system 618 that can control the lidar system 100 as well as the other sensor systems 602-604. The sensor management system 618, for instance, can indicate geographic areas of interest to the lidar system 100. Thus, the controller 114 can control the power level based on the geographic area of interest (e.g., increase the SNR for the geographic area of interest) indicated by the sensor management system 618. Additionally or alternatively, the sensor management system 618 can transmit data to the lidar system 100 to enable the controller 114 to contextually adjust the power of the optical signal 106 emitted by the FMCW laser source 102.

The memory 616 can further include a perception system 620 that can perceive objects within an environment of the autonomous vehicle 600. According to an example, the sensor management system 618 can transmit perception data generated by the perception system 620 from one or more differing types of sensor system 602-604 to the lidar system 100 to control the power of the lidar system 100 within a frame and/or between frames. Additionally or alternatively, the sensor management system 618 can control the lidar system 100 based on the perception data (e.g., indicate a geographic area of interest to the lidar system 100 determined based on the perception data). For instance, the perception system 620 can be unable to determine whether an object is at a given location based on data obtained from one or more of the sensor systems 602-604 (e.g., an ambiguity at a geographic location can exist due to differences between outputs of differing sensor systems 602-604). Thus, the sensor management system 618 can indicate to the lidar system 100 that such geographic location is ambiguous, which can enable the controller 114 to increase the power level of the optical signal 106 directed towards the ambiguous location.

The memory 616 can further include a motion planner system 622 that can determine maneuvers to be performed by the autonomous vehicle 600 in the environment. For instance, the motion planner system 622 can determine a maneuver to be performed based on the output of the perception system 620. Based on a type of maneuver to be performed by the motion planner system 622, the sensor management system 618 can signify the maneuver to be performed by the autonomous vehicle 600 to the lidar system 100. The controller 114 of the lidar system 100 can control the power of the optical signal 106 based on the maneuver to be performed. For instance, the motion planner system 622 can indicate that an unprotected left turn is to be performed by the autonomous vehicle 600; accordingly, the sensor management system 618 can specify (to the lidar system 100) a geographic area of interest for which a higher power level for the optical signal 106 can desirably be directed (e.g., enable the lidar system 100 to detect object(s) at a farther distance in a particular geographic region).

The computing system 612 can further include a data store 626. The data store 626 can store map data 628 of a 3D map of the environment. According to an example, the sensor management system 618 can provide at least a portion of the map data 628 to the lidar system 100 to enable the controller 114 to control the power of the laser source 102 as described herein. In accordance with another example, the sensor management system 618 can control the lidar system 100 as described herein based on the map data

628. Pursuant to an illustration, the map data 628 can indicate locations of buildings; the sensor management system 618 can control the lidar system 100 to lower the power level for the FMCW laser source 102 when the optical signal 106 is directed towards the locations of the buildings.

The memory 616 can further include a control system 624. The control system 624 is configured to control at least one of the mechanical systems of the autonomous vehicle 600 (e.g., at least one of the vehicle propulsion system 606, the braking system 608, and/or the steering system 610). For instance, the control system 624 can control the vehicle propulsion system 606, the braking system 608, and/or the steering system 610 based on a motion plan for the autonomous vehicle 600 generated by the motion planner system 622.

Figure 7:
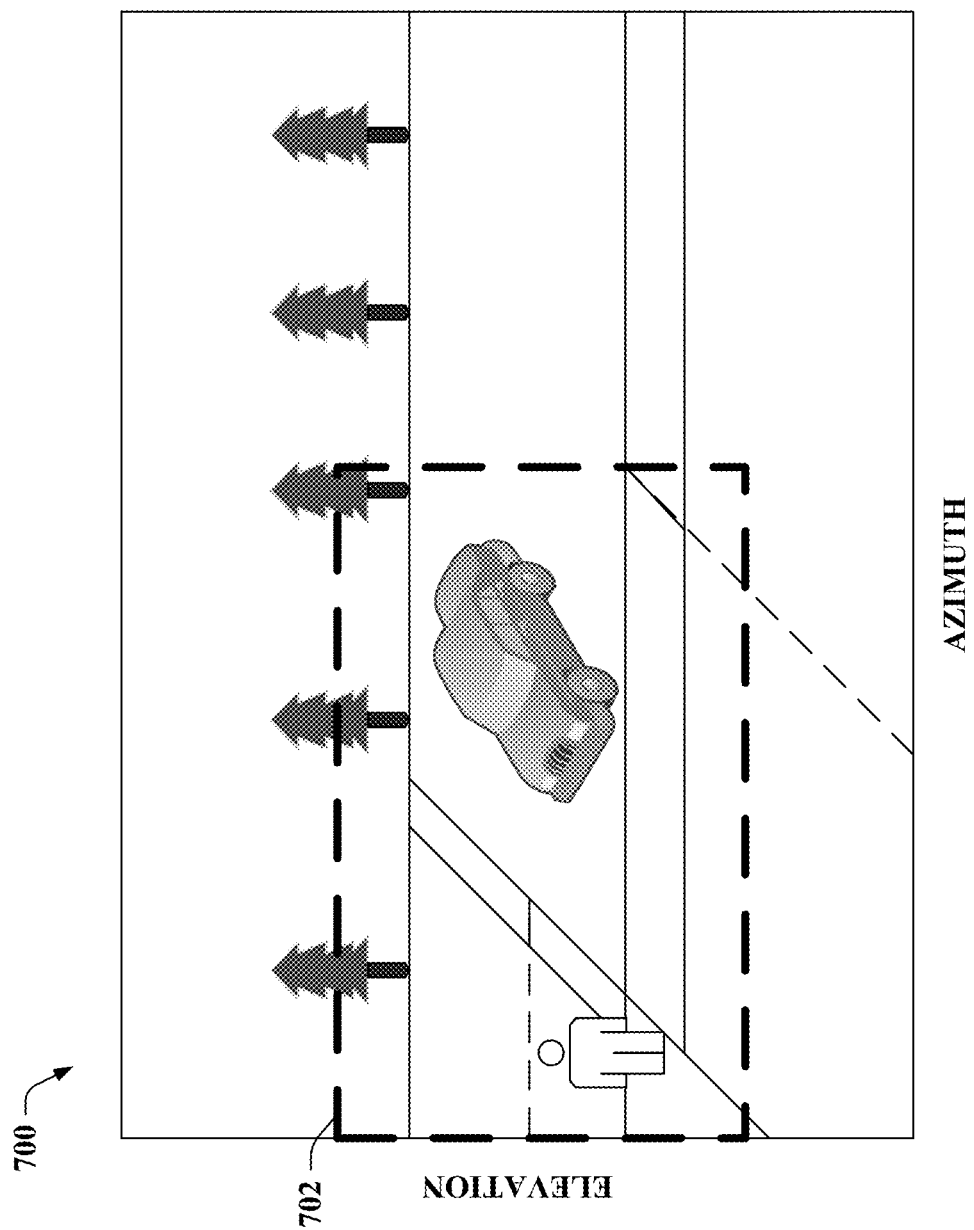
FIG. 7 illustrates another exemplary frame for the lidar system.

Now turning to FIG. 7, illustrated is an exemplary frame 700 according to various embodiments. As shown, a first spatial portion 702 of the field of view in the environment can include a geographic area of interest. Accordingly, the power level of the optical signal 106 controlled by the controller 114 for the spatial portion 702 can be higher than the power level for a remaining portion of the field of view of the frame 700.

Figure 8:
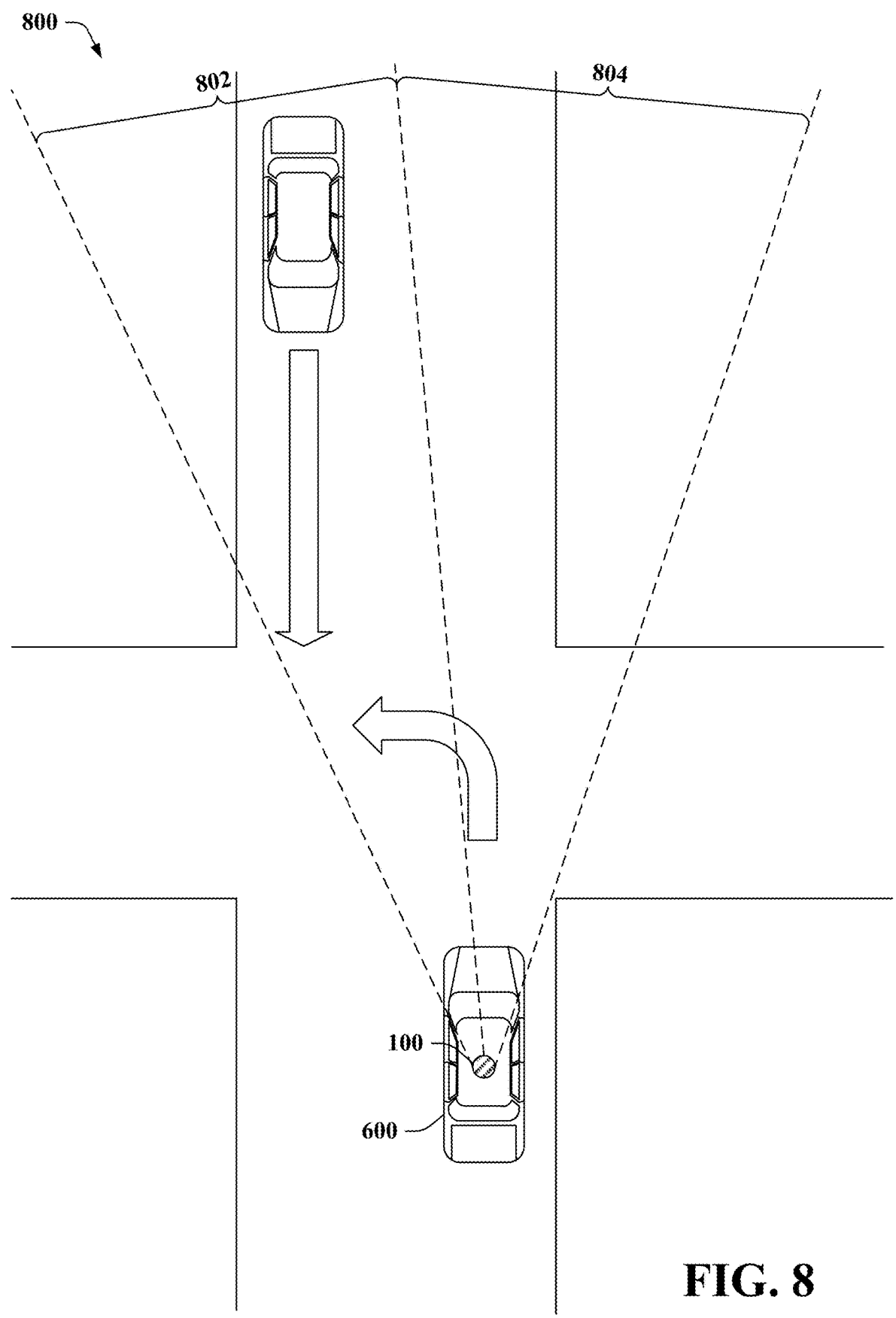
FIG. 8 illustrates an exemplary environment that includes the autonomous vehicle of FIG. 6.

Turning to FIG. 8, illustrated is an exemplary environment 800 that includes the autonomous vehicle 600. As shown, the autonomous vehicle 600 can desirably perform an unprotected left turn (e.g., the motion planner system 622 can cause the autonomous vehicle 600 to desirably perform an unprotected left turn). Thus, the lidar system 100 can be controlled based on the maneuver to be performed such that the optical signal 106 is emitted at a higher power level when directed within a portion 802 of the environment 800 as compared to a differing portion 804 of the environment 800. Accordingly, object(s) (e.g., oncoming traffic) in the portion 802 of the environment 800 can be detected by the lidar system 100 at a farther distance. Observations made by the lidar system 100 thus can be tailored based on the maneuver to be performed by the autonomous vehicle 600.

Figure 9:
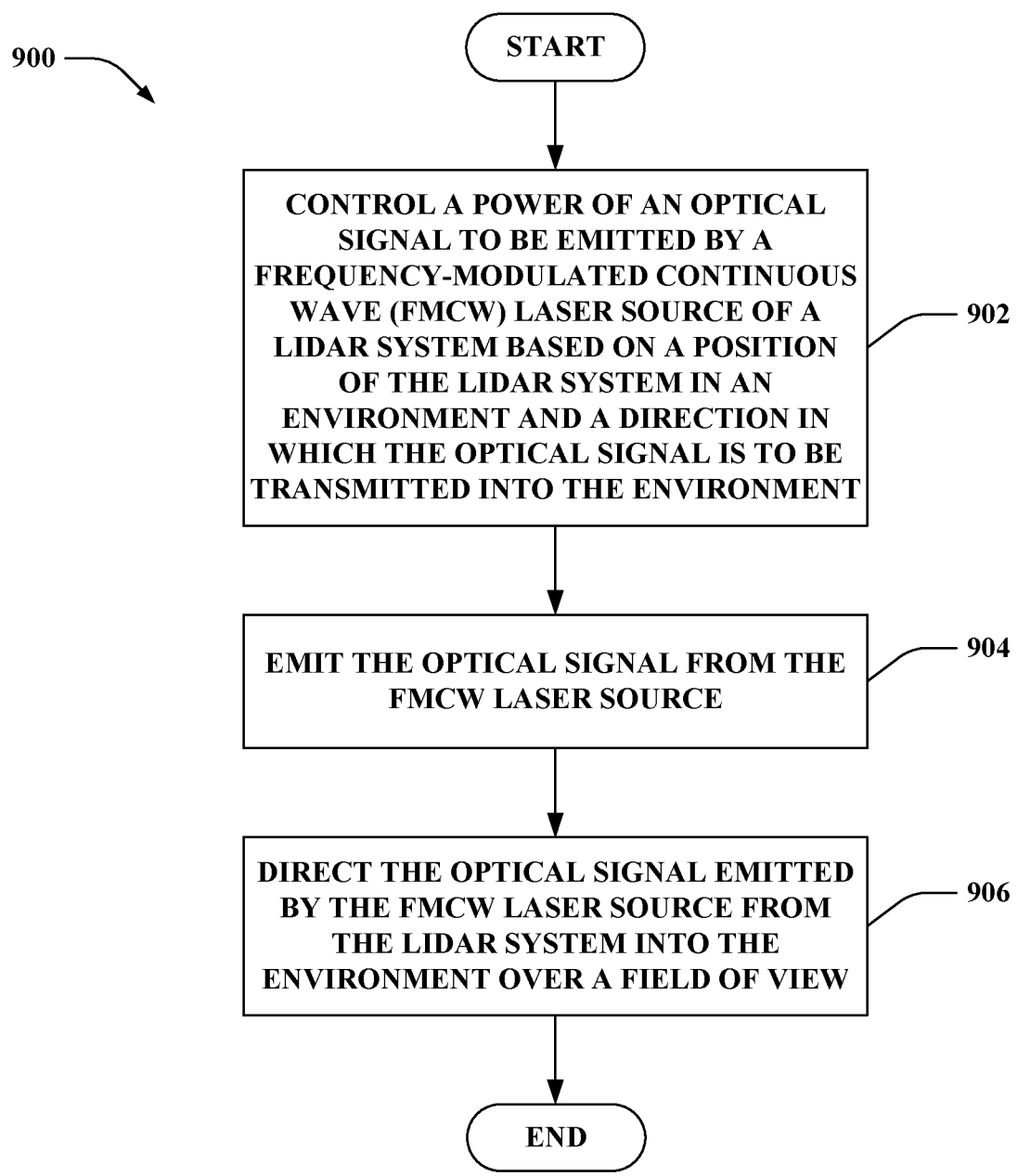
FIG. 9 is a flow diagram that illustrates an exemplary methodology of operating a lidar system.

FIG. 9 illustrates an exemplary methodology relating to operating a lidar system. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 of operating a lidar system. At 902, a power of an optical signal to be emitted by a frequency-modulated continuous wave (FMCW) laser source of the lidar system can be controlled based on a position of the lidar system in an environment and a direction in which the optical signal is to be transmitted into the environment. The power of the optical signal to be emitted by the FMCW laser source can be modulated between frames based on the position of the lidar system in the environment and the direction in which the optical signal is to be transmitted into the environment. Additionally or alternatively, the power of the optical signal to be emitted by the FMCW laser source can be modulated within one or more frames based on the position of the lidar system in the environment and the direction in which the optical signal is to be transmitted into the environment. Moreover, the power of the optical signal to be emitted by the FMCW laser source can be further modulated between the frames and/or within one or more of the frames based on data from a 3D map of the environment, a previous lidar scan of the environment, perception data generated by a differing type of sensor system other than the lidar system, a maneuver to be performed by an autonomous vehicle in the environment, distance and speed of a target in the environment, or a combination thereof. At 904, the optical signal can be emitted from the FMCW laser source at the power as modulated. At 906, the optical signal emitted by the FMCW laser source can be directed from the lidar system into the environment. The optical signal can be directed over a field of view in the environment during time period of the frames.

Figure 10:
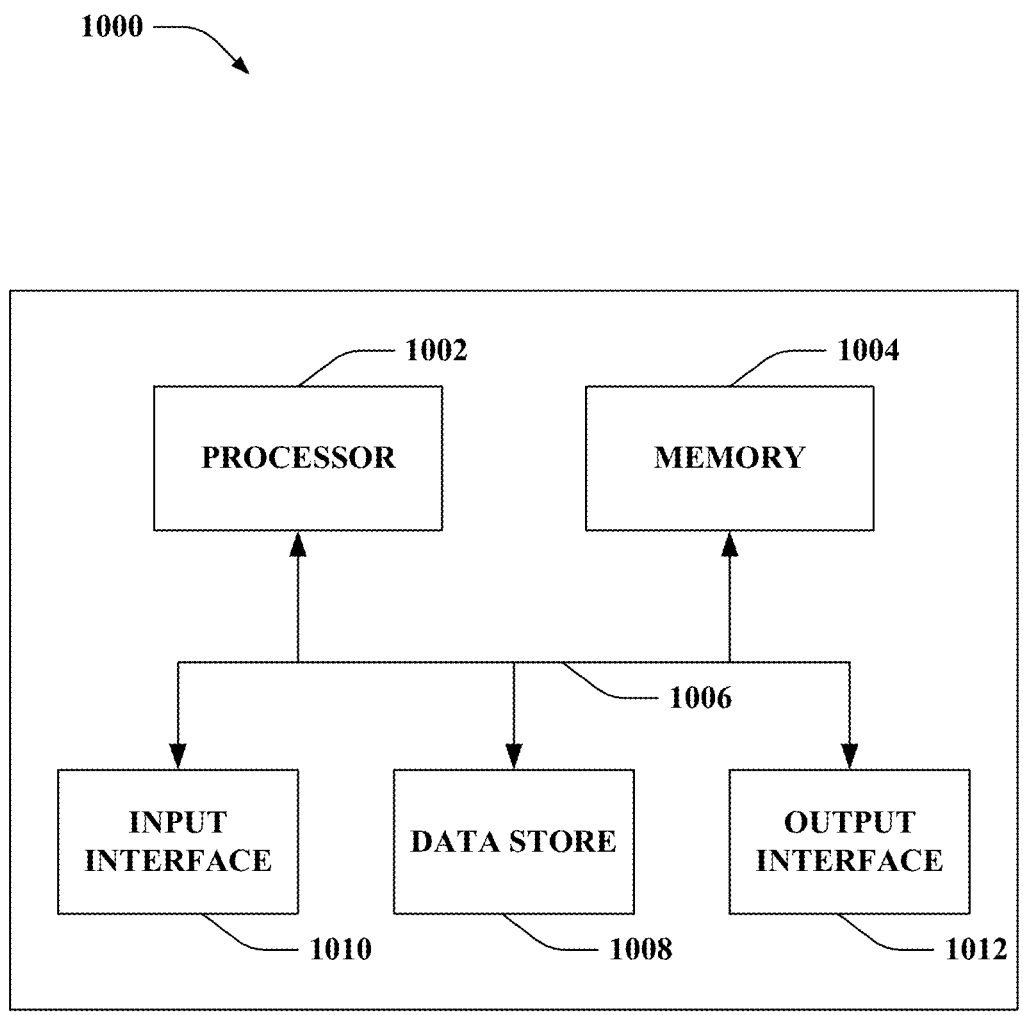
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be or include the computing system 612. According to another example, the computing system 1000 may be or include the controller 114. The computing device 1000 includes at least one processor 1002 that executes instructions that are stored in a memory 1004. The instructions may be, for instance, instructions for implementing functionality described as being carried out by one or more systems discussed above or instructions for implementing one or more of the methods described above. The processor 1002 may be a GPU, a plurality of GPUs, a CPU, a plurality of CPUs, a multi-core processor, etc. The processor 1002 may access the memory 1004 by way of a system bus 1006. In addition to storing executable instructions, the memory 1004 may also store lidar scan data, map data, perception data generated by various types of sensor systems, maneuver data, and so forth.

The computing device 1000 additionally includes a data store 1008 that is accessible by the processor 1002 by way of the system bus 1006. The data store 1008 may include executable instructions, lidar scan data, map data, perception data generated by various types of sensor systems, maneuver data, etc. The computing device 1000 also includes an input interface 1010 that allows external devices to communicate with the computing device 1000. For instance, the input interface 1010 may be used to receive instructions from an external computer device, etc. The computing device 1000 also includes an output interface 1012 that interfaces the computing device 1000 with one or more external devices. For example, the computing device 1000 (e.g., the computing system 612) may transmit control signals to the vehicle propulsion system 606, the braking system 608, and/or the steering system 610 by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A lidar system, comprising:
    a frequency-modulated continuous wave (FMCW) laser source configured to emit an optical signal, the optical signal comprises a continuous series of optical chirps, wherein frequency within each chirp varies with time;
    a scanner configured to direct the optical signal emitted by the FMCW laser source from the lidar system into an environment, the scanner directs the optical signal over a field of view in the environment during a time period of a frame based on a scan pattern; and
    a controller configured to modulate a power of the optical signal emitted by the FMCW laser source during the time period of the frame based on a position of the lidar system in the environment, a direction in which the optical signal is to be transmitted into the environment, and whether an ambiguity exists in perception data of the environment regarding an existence of an object at a geographic location, wherein the ambiguity at the geographic location exists when there are differences between outputs of differing types of sensor systems for the geographic location pertaining to the existence of the object at the geographic location, wherein the controller controls the FMCW laser source to emit the optical signal at:
        a first power level when the scanner directs the optical signal over a first spatial portion of the field of view in the environment during the time period of the frame; and
        a second power level when the scanner directs the optical signal over a second spatial portion of the field of view in the environment during the time period of the frame;
        wherein the first power level is higher than the second power level; and
        wherein the first spatial portion of the field of view in the environment comprises the geographic location when the ambiguity exists at the geographic location in the perception data such that the controller controls the FMCW laser source to emit at the first power level when the scanner directs the optical signal towards the geographic location at which the ambiguity exists in the perception data during the time period of the frame.

2. The lidar system of claim 1, further comprising:
    a receiver configured to sense a reflected optical signal at the lidar system;
    wherein the controller is further configured to identify the first spatial portion and the second spatial portion of the field of view in the environment based on a previous lidar scan of the environment.

3. The lidar system of claim 1, wherein the controller is further configured to identify the first spatial portion and the second spatial portion of the field of view in the environment based on data from a three-dimensional (3D) map of the environment.

4. The lidar system of claim 1, wherein the controller is further configured to identify the first spatial portion and the second spatial portion of the field of view in the environment based on a previous lidar scan of the environment.

5. The lidar system of claim 1, wherein the controller is further configured to identify the first spatial portion and the second spatial portion of the field of view in the environment based on a maneuver to be performed by an autonomous vehicle in the environment.

6. The lidar system of claim 1, wherein the controller is further configured to identify the first spatial portion and the second spatial portion of the field of view in the environment based on distance and speed of a target.

7. The lidar system of claim 1, wherein the first spatial portion of the field of view in the environment is directed towards a geographic area of interest.

8. The lidar system of claim 1, wherein the scanner comprises a two-dimensional (2D) micro-electro-mechanical systems (MEMS) mirror.

9. The lidar system of claim 1, the controller adjusts the power of the optical signal emitted by the FMCW laser source between the frame and a subsequent frame.

10. The lidar system of claim 9, wherein the controller controls the FMCW laser source to emit the optical signal at a constant power level as the scanner directs the optical signal over the field of view in the environment during a subsequent time period of the subsequent frame to form the scan pattern.

11. A lidar system, comprising:
a frequency-modulated continuous wave (FMCW) laser source configured to emit an optical signal, the optical signal comprises a continuous series of optical chirps, wherein frequency within each chirp varies with time;
a scanner configured to direct the optical signal emitted by the FMCW laser source from the lidar system into an environment, the scanner directs the optical signal over a field of view in the environment during time periods of frames; and
a controller configured to modulate a power of the optical signal emitted by the FMCW laser source between the frames based on a position of the lidar system in the environment, a direction in which the optical signal is to be transmitted into the environment, and whether an ambiguity exists in perception data of the environment regarding an existence of an object at a geographic location, wherein the ambiguity at the geographic location exists when there are differences between outputs of differing types of sensor systems for the geographic location pertaining to the existence of the object at the geographic location, wherein the controller controls the FMCW laser source to emit the optical signal at:
a first power level when the scanner directs the optical signal over at least a portion of the field of view in the environment during a first time period of a first frame; and
a second power level when the scanner directs the optical signal over the portion of the field of view in the environment during a second time period of a second frame;
wherein first second power level is higher than the first power level; and
wherein the portion of the field of view in the environment comprises the geographic location when the ambiguity exists at the geographic location in the perception data such that the controller controls the FMCW laser to emit at the second power level when the scanner directs the optical signal towards the geographic location at which the ambiguity exists in the perception data during the second time period of the second frame.

12. The lidar system of claim 11, wherein the controller is configured to modulate the power of the optical signal emitted by the FMCW laser source between the frames further based on data from a three-dimensional (3D) map of the environment.

13. The lidar system of claim 11, wherein the controller is configured to modulate the power of the optical signal emitted by the FMCW laser source between the frames further based on a previous lidar scan of the environment.

14. The lidar system of claim 11, wherein the controller is configured to modulate the power of the optical signal emitted by the FMCW laser source between the frames further based on a maneuver to be performed by an autonomous vehicle in the environment.

15. The lidar system of claim 11, the controller further configured to modulate the power of the optical signal emitted by the FMCW laser source during at least one of the first time period of the first frame or the second time period of the second frame.

16. A method of operating a lidar system, comprising:
controlling modulation of a power of an optical signal to be emitted by a frequency-modulated continuous wavelength (FMCW) laser source of the lidar system based on a position of the lidar system in an environment, a direction in which the optical signal is to be transmitted into the environment, and whether an ambiguity exists in perception data of the environment regarding an existence of an object at a geographic location, wherein the ambiguity at the geographic location exists when there are differences between outputs of differing types of sensor systems for the geographic location pertaining to the existence of the object at the geographic location, wherein the power of the optical signal to be emitted by the FMCW laser source is modulated within one or more frames such that the FMCW laser source operates at a first power level when the optical signal is directed towards a first spatial portion of a field of view in the environment that comprises the geographic location at which the ambiguity exists in the perception data and operates at a second power level when the optical signal is directed towards a second spatial portion of the field of view in the environment, wherein the first power level is higher than the second power level;
emitting the optical signal from the FMCW laser source at the power as modulated, the optical signal comprises a continuous series of optical chirps, wherein frequency within each chirp varies with time; and
directing the optical signal emitted by the FMCW laser source from the lidar system into the environment, the optical signal being directed over a field of view in the environment during time periods of the frames.

17. The method of claim 16, wherein the power of the optical signal to be emitted by the FMCW laser source is further modulated within the one or more of the frames based on the position of the lidar system in the environment and the direction in which the optical signal is to be transmitted into the environment.

18. The method of claim 16, wherein the power of the optical signal to be emitted by the FMCW laser source is further modulated based on at least one of data from a three-dimensional (3D) map of the environment, a previous lidar scan of the environment, perception data generated by a differing type of sensor system other than the lidar system, or a maneuver to be performed by an autonomous vehicle in the environment.

19. The lidar system of claim 11, wherein the controller is configured to modulate the power of the optical signal emitted by the FMCW laser source between the frames further based on distance and speed of a target.

20. The method of claim 16, wherein the power of the optical signal to be emitted by the FMCW laser source is further modulated based on distance and speed of a target.

* * * * *